Feb. 3, 1942.  J. C. MULLEN  2,271,949
TAP BUSHING
Original Filed July 10, 1939
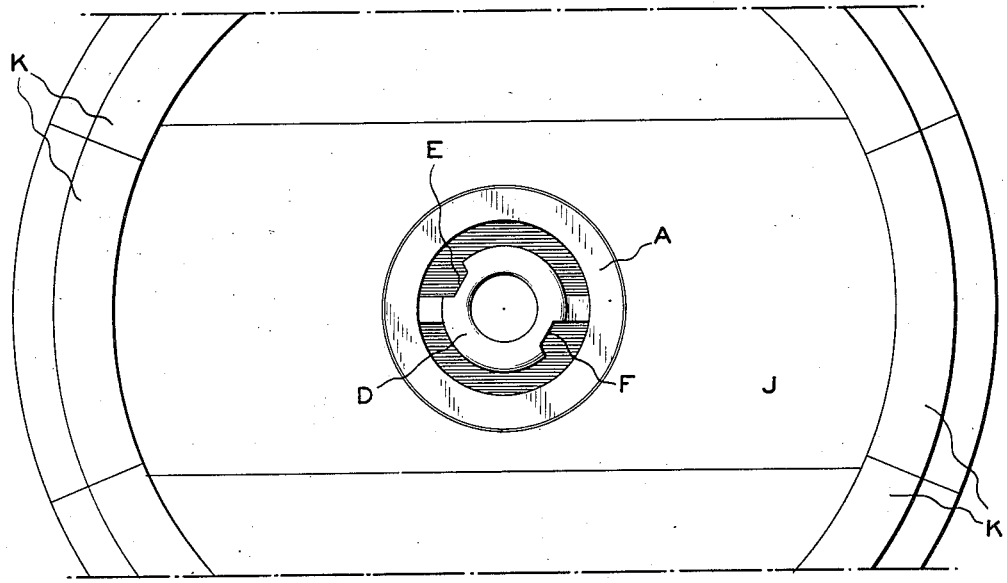
Fig.1.
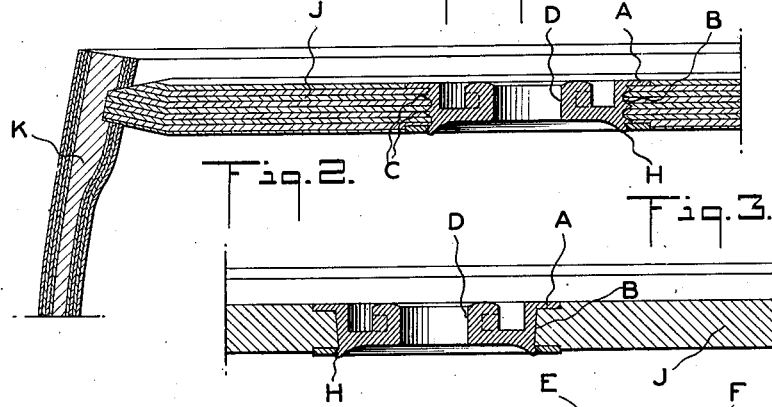
Fig.2.
Fig.3.
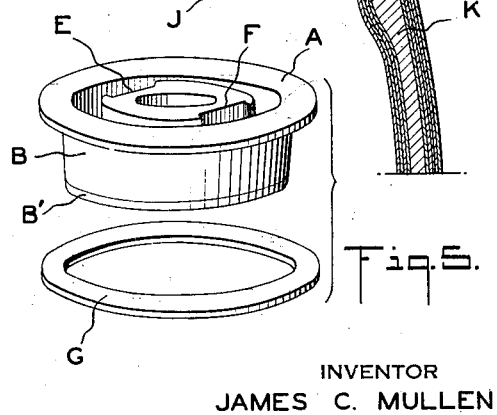
Fig.4.
Fig.5.
INVENTOR
JAMES C. MULLEN
BY
ATTORNEY Patented Feb. 3, 1942

2,271,949

UNITED STATES PATENT OFFICE 2,271,949

TAP BUSHING

James C. Mullen, Cliffside Park, N. J., assignor to Verdi Bros. Cooperage Company, North Bergen, N. J., a corporation of New Jersey Continuation of application Serial No. 283,647, July 10, 1939. This application August 29, 1939, Serial No. 292,396

1 Claim. (Cl. 220—113)

This invention relates to tap bushings and has more particular reference to tap bushings adapted for use in conjunction with barrels or kegs which are subjected to considerable gaseous pressure, for instance, such barrels or kegs as are used in the fermentation industry, particularly beer barrels or kegs, and is a continuation of the invention disclosed in the application of James C. Mullen for Tap bush, Serial No. 283,647.

This invention aims to provide simple and effective means for securing and sealing a bushing in place irrespective of the type of barrel material with which it is used.

Other objects will become apparent as the description of the particular embodiments chosen to illustrate the invention progresses.

While the invention is not limited in its application to any particular type of keg material, nevertheless it is more especially adaptable for use with a barrel or keg in which the material constituting the wall of the bush receiving opening is relatively soft, that is, where the material of the keg or barrel consists of wood or similar material.

The conventional tap bushing heretofore used with wooden barrels or kegs as exemplified in Patent No. 1,386,949 relies for sealing solely on the engagement of the course threads with the material of the barrel or keg. This seal has proved ineffective particularly when applied to laminated constructions, the threads tending to separate the laminations and to permit the barrel contents to enter the crevices thus formed with a consequent deterioration of the barrel.

Generally speaking, the present invention provides a simple and effective arrangement for pressing together the opposite edges of the material constituting the barrel part in which the bushing is seated while at the same time locking the bushing securely in place and effectively sealing the end of the bushing located on the inner face of the barrel or keg part.

More specifically stated the invention comprises a tap bush having a separable auxiliary annular flange or gasket adapted to be secured to the bushing by rolling or peening down the projecting edge of a continuation of the cylindrical portion or sleeve of the bush over the inner circumferential edge of the gasket or flange. This rolling or peening down of the projecting edge of the cylindrical portion forces the flanges toward each other and provides two oppositely disposed annular flanges overlying the opposite sides of the barrel part to hold the bush securely in place and to clamp together the ends of the material constituting the keg part opening.

While one embodiment of this invention is illustrated in the accompanying drawing, it is to be understood that such embodiments merely serve as an illustration of the underlying principles of the invention so that it may be readily comprehended by those skilled in the art, and is not intended as limiting the invention to the specific details disclosed therein.

In said drawing:

Fig. 1 is a top plan view of the invention as applied to a barrel or keg head,

Fig. 2 is a vertical section of the invention as applied to a laminated barrel and stave construction, the latter being shown partly fragmentary, Fig. 3 is a vertical section of the invention as applied to a solid head and laminated stave construction, the latter being partly fragmentary, Fig. 4 shows in perspective the type of tap bushing shown in Fig. 2 disassembled, and Fig. 5 shows a perspective view of the invention shown in Fig. 3 disassembled.

Continuing now by way of a more detailed description, a bushing comprises an upper annular flange A preferably integrally formed with a hollow, preferably tapered cylindrical portion or sleeve B of smaller diameter than the outside diameter of the flange. The outer periphery of the cylindrical portion is either threaded as at C and as shown in Fig. 4 preferably with relatively deep threads so that it may be conveniently screwed into the tap bush receiving opening formed in the barrel or keg head or is free from threads as shown in Fig. 5 of the drawing. In either form a capstan head D having a longitudinal bore similar to that shown in Patent No. 1,386,949 above referred to may be axially disposed in the cylindrical portion or sleeve. The head may have oppositely disposed tool engaging openings E and F. This capstan head and the tool engaging openings may be used for conveniently engaging the bush and forcing it into place. The type of bushing shown in Fig. 5 may be forced into place in any convenient manner, the capstan head and tool engaging openings E and F in this case, however, forming a convenient means for holding the tap bushing while the rolling operation to be hereinafter described takes place. In either form the hollow cylindrical tapered portion or sleeve B projects downwardly a sufficient distance to form a thin sleeve or extension piece B' forming a seat for a separable auxiliary flange or gasket G adapted to be slipped over the extension piece B' so as to rest on the bottom of the threads, or brought to rest on the tapered portion of the cone shaped cylindrical portion B. When the flange G is seated the extension B' extends slightly below the flange and may be rolled over or crimped at H to lock the flange G to the bush and to simultaneously clamp together the opposite circumferential edges of the bush receiving opening of the head J illustratively shown as supported in suitable barrel staves K. The foregoing arrangement provides an arrangement in which the annular flange G is located on the inside of the barrel so that the space between the bush and opening resulting from the insertion of a tapered bush in the bored bush receiving opening is effectively sealed. The ring A which is forced firmly against the opposite side of the barrel part by the crimping or rolling action and the bush so clamped not only effectively prevents leakage into the space between the tapered end and the bored opening but slightly compresses the ends of the material constituting the barrel or keg head and this is of especial importance in wooden kegs whether solid or laminated to prevent deterioration by seepage of the barrel contents into the ends of the material surrounding the bush.

It is claimed:

Tap bushing for beer barrels combining with a compressible barrel part having a bored opening, of a tubular member having integral therewith at one end thereof a flange for engagement with one side of the barrel part, and having a part at the other end thereof for extension beyond the other side of the barrel part, and a part tapering inwardly to said extension part between the latter and said flange, and a separable auxiliary flange embracing said extension of the tubular member, seated in a depression in the adjacent face of the compressible barrel part, and in part seated on said tapered portion of the tubular member; the extension portion of the tubular member being rolled over and set to the auxiliary flange under pressure sufficient to form said depression and to effect such seating of the auxiliary flange, and the auxiliary flange being held in said seating by the rolled-over part of the tubular member.

JAMES C. MULLEN.